United States Patent

[11] 3,610,677

| [72] | Inventors | Bradford F. Hawley<br>West Boylston;<br>Fred J. Curtis, Shrewsbury, both of Mass. |
|---|---|---|
| [21] | Appl. No. | 849,959 |
| [22] | Filed | Aug. 14, 1969 |
| [45] | Patented | Oct. 5, 1971 |
| [73] | Assignee | Curtis Tractor Cab Inc.<br>Shrewsbury, Mass. |

[54] TRACTOR CAB
9 Claims, 10 Drawing Figs.

[52] U.S. Cl. .................................................. 296/28 C,
296/102
[51] Int. Cl. ...................................................... B62d 31/00
[50] Field of Search........................................ 296/28 R,
78, 28 C, 102

[56] References Cited
UNITED STATES PATENTS

| 2,423,748 | 7/1947 | Acheson.................... | 296/78 UX |
| 2,430,442 | 11/1947 | Acheson.................... | 296/28 (.21) UX |
| 3,341,247 | 9/1967 | Martinmaas................ | 296/28 (.21) |

FOREIGN PATENTS

| 1,072,291 | 3/1954 | France ........................ | 296/102 |
| 1,228,962 | 3/1960 | France ........................ | 296/102 |
| 920,069 | 3/1962 | Great Britain............... | 296/102 |

*Primary Examiner*—Benjamin Hersh
*Assistant Examiner*—John A. Pekar
*Attorney*—Norman S. Blodgett

ABSTRACT: This invention relates to a tractor cab and, more particularly, to apparatus for the protection of a tractor operator from the weather.

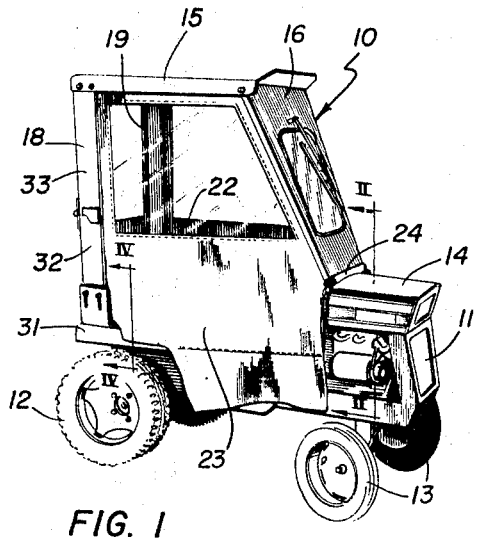
FIG. 1
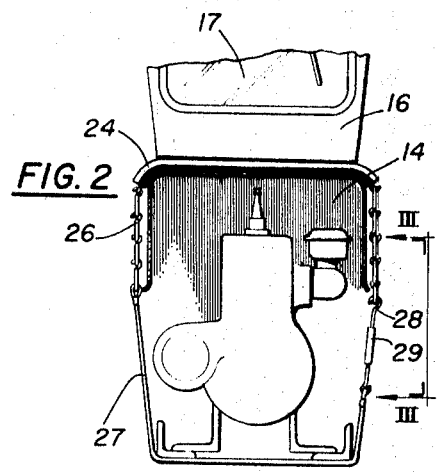
FIG. 2
FIG. 3
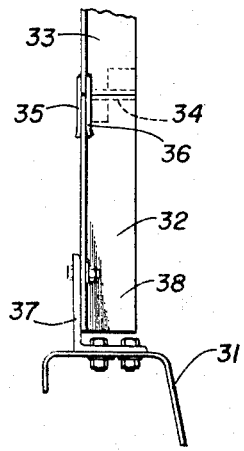
FIG. 4
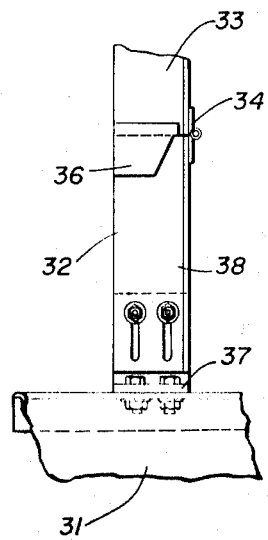
FIG. 5
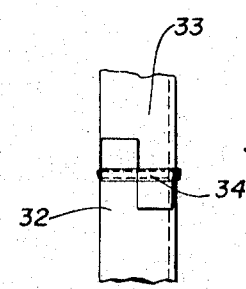
FIG. 6
BRADFORD F. HAWLEY
FRED J. CURTIS
                INVENTORS.
BY 3,610,677

TRACTOR CAB

BACKGROUND OF THE INVENTION

Although it is possible to operate a tractor during most seasons of the year without a cab for protection from the elements, the use is considerably limited in the winter without a cab. This is especially true of the home-type tractor which is used for lawn mowing in the summer and for plowing in the winter. Attempts to provide the smaller tractors with a cab have resulted in one which is difficult to remove, which is expensive, and which is not adapted to fit all shapes and sizes of tractors. These and other difficulties experienced with the prior art devices have been obviated in a novel manner by the present invention.

It is, therefore, an outstanding object of the invention to provide a tractor cab that will operate effectively with a wide variety of sizes and shapes of tractor.

Another object of this invention is the provision of a cab which may be quickly and easily attached to a tractor.

A further object of the present invention is the provision of a tractor cab which permits access to the engine compartment without completely removing it from the tractor.

It is another object of the instant invention to provide a removable cab for a tractor, which cab is simple and rugged in construction, inexpensive to manufacture, and capable of a long life of useful service.

With these and other objects in view, as will be apparent to those skilled in the art, the invention resides in the combination of parts set forth in the specification and covered by the claims appended hereto.

SUMMARY OF THE INVENTION

In general, the invention consists of a cab for use with a tractor having rear wheels, front wheels, and an engine compartment. The cab has a main enclosure which extends between the rear wheels and the front wheels and overlies a portion of the engine compartment. The enclosure consists of a rigid front panel having a window, a rigid roof, a rigid rear panel having a window, and two flexible side panels having windows. The lower edge of the front panel is padded and rests on the engine compartment. A flexible element extends from the front panel entirely around the engine compartment. The rear end of the enclosure is hingedly attached to the tractor.

BRIEF DESCRIPTION OF THE DRAWING

The character of the invention, however, may be best understood by reference to one of its structural forms, as illustrated by the accompanying drawings, in which:

FIG. 1 is a perspective view of a tractor cab embodying the principles of the present invention, FIG. 2 is a sectional view at the front of the cab taken on the line II—II of FIG. 1, FIG. 3 is a side view of a flexible element taken on the line III—III of FIG. 2, FIG. 4 is a sectional view at the back of the cab taken on the line IV—IV of FIG. 1, FIG. 5 is a side elevational view of the elements shown in FIG. 4, FIG. 6 is a rear elevational view of the elements shown in FIG. 4.

DESCRIPTION OF THE PREFERRED EMBODIMENT

Figure 7:
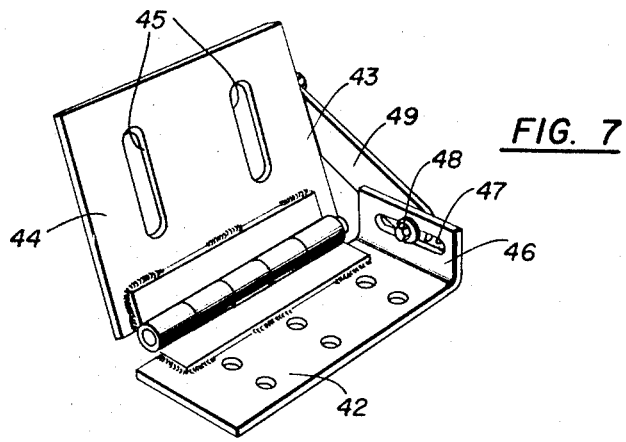
FIG. 7 is a perspective view of a modified method of attaching the cab enclosure to the tractor.

Referring first to FIG. 1, wherein are best shown the general features of the invention, the cab, indicated generally by the reference numeral 10, is shown in use with a tractor 11 having rear wheels 12, front wheels 13, and an engine compartment 14. A main enclosure 15 extends between the rear wheels 12 at one end and the front wheels 13 at the other end, thus covering the driver's seat (not shown). The enclosure 15 consists of a front panel 16 made of sheet metal and having a window 17 and of a rear panel 18 also formed of sheet metal and having a window 19. A rigid sheet metal roof 21 extends between the front panel and the rear panel. Flexible side panels 22 and 23 with clear plastic windows extend between the side edges of the front panel, rear panel, and roof. In the preferred embodiment, these side panels are formed from heavy nylon cloth.

In FIG. 2 it can be seen that the lower edge of the front panel 16 is provided with a padding where it rests on the top of the hood or engine compartment 14. The padding consists of a rubber tube 24 through which extends a flexible element 25. The flexible element extends from one side of the lower edge of the front panel, around the engine compartment, and back to the other side of the panel. The upper part of the flexible element 25 consists of a section 26 of flat chain (see FIG. 3). The lower part consists of a length 27 of steel cable. The ends of the section of chain and the length of cable are permanently tied together on one side and on the other side are releasably joined by a hook 28 and a turnbuckle 29.

As is evident in FIG. 4, the tractor is provided with a fender 31 over each rear wheel 12, the fender having a flat horizontal upper surface to which is bolted a post 32 formed of angle iron. The rear panel 18 of the cab enclosure is formed with an angle iron corner post 33 exactly aligned with the post 32. The two posts or angle iron are joined by a hinge 34. The forwardly directed flange of the post 33 is provided with parallel plates 35 and 36 whose lower edges are flared outwardly to receive the upper edge of the corresponding forwardly directed flange of the post 32. The fixed lower post 33 is formed in two parts 37 and 38 which are joined by slots and bolts to permit adjustment of the post height; this permits the adjustment necessary to adapt the cab to various sizes of tractor.

Figure 8:
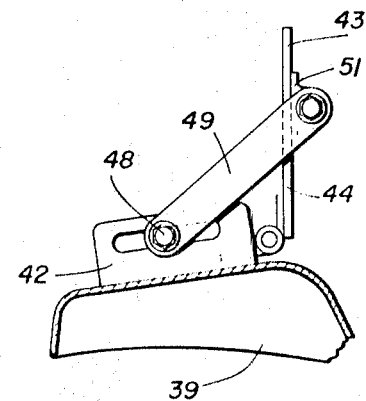
FIG. 8 is a front elevational view of the elements shown in FIG. 7.

FIGS. 7 and 8 show an adapter to take the place of the part 37 to permit the use of the cab with tractors whose fenders have inclined upper surfaces. The fender 39 has an inclined upper surface 41 to which is bolted a plate 42 which is part of an adapter 43. The plate is hingedly connected to a plate 44 which is formed with slots 45 that permit it to be attached to the vertical post. Extending upwardly from one end of the plate is an upwardly directed flange 46 having a horizontal slot 47. In the slot lies a bolt 48 extending from one end of a brace 49, the other end of which is bolted to an ear 51 formed on the plate 44. The plates 42 and 44 can, therefore, be locked at a desired angle by tightening the bolt 48 in the selected position.

Figure 9:
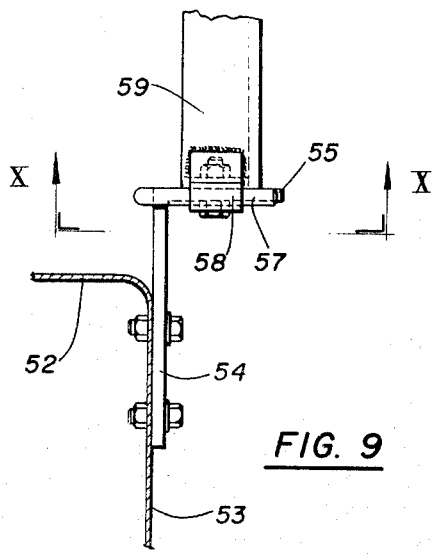
FIG. 9 is a front elevational view of another modification of the means for attaching the cab to the tractor.
Figure 10:
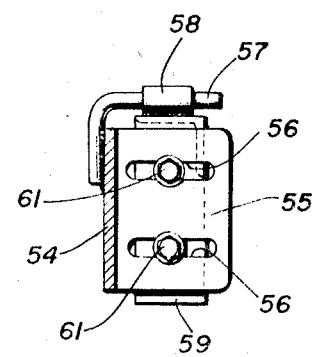
FIG. 10 is a sectional view taken on the line X—X of FIG. 9.

FIGS. 9 and 10 show the manner in which the cab is connected to a tractor which is constructed so that the only convenient surface for connection to the cab enclosure is vertical. The fender 52 has a vertical surface 53 to which is bolted a plate 54. The plate is formed at its upper end with a horizontal flange 55 formed with laterally extending slots 56. Welded to the plate 54 is an L-shaped pintle 57 having a straight free end lying parallel to the slots 56 and spaced from the adjacent edge of the flange 55. Slidable over this pintle is a tube 58 welded to the bottom of a vertical post 59 having a horizontal plate welded across its lower end. Bolts 61 extend through the slots 56 and are threaded into this plate. It should be noted that the pintles on both sides of the tractor extend in the same direction, so that the cab can be moved laterally into place. This method of attachment permits the cab to be centered despite variations of the fender-to-fender distance in various models of tractors. Once the cab has been moved into place with the tubes on the pintles, it can be adjusted laterally to make sure that the front panel has a proper relation to the engine compartment and then the bolts 61 are placed and tightened to lock the elements in the selected relationship.

The operation of the cab will now be readily understood in view of the above description. The attachment of the front panel 16 to the engine compartment is readily accomplished, irrespective of the shape and size of the hood and frame; this is true because of the ability of the flexible element to adapt to wide variations in tractor engine compartments and frames. When it comes to fastening the rear panel 18 to the back of the tractor, it is necessary to take into account the type of fender used on the particular model of tractor. When the fender has a flat horizontal upper surface, the simple angle iron type of adapter shown in FIG. 4 as part 37 may be used. Variations in fender-to-fender distance present no problem, since the post is simply bolted to the fender in the position that it naturally falls after the front panel has been fastened in place. When the fenders have only inclined surfaces, the adapter 43 shown in FIG. 7 is used; here again, the variations in fender-to-fender distance are readily compensated for by bolting the adapter in place after the front panel has been fastened. The brace 49 is locked in a position of angular adjustment relative to the plate 42 that will render it vertical. The use of the plate 54 and its associated elements shown in FIG. 9 on tractors having fenders with vertical surfaces has already been explained. When it is necessary to obtain access to the engine compartment, it is only necessary to loosen the turnbuckle 29, to remove the hook 28 from the last link of the chain, and the front panel is free. Then, the entire cab can be swung upwardly and rearwardly about the rear hinges 34.

It can be seen, the, that the cab of the present invention is simple in construction and, therefore, relatively inexpensive to manufacture. A single standard design can be easily modified to adapt it to all sizes and shapes of tractor, and this results in the usual benefits of such standard design, i.e., mass production methods of manufacture and simplified distribution and service procedures. In the practical commercial use of the present invention, it is only necessary for the manufacturer to supply a few basic sizes of enclosure to take care of a wide range of sizes of tractors. At the same time, it is a very simple matter to remove the cab for use in summer. If desired, the rigid portions of the cab can be retained for shade in the warm weather, but the flexible curtains or side panels removed.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A cab for use with a tractor having rear wheels, front wheels, and an engine compartment, comprising
   a. a main enclosure adapted to extend between the rear wheels and the front wheels and to overlie at least a portion of the compartment, the enclosure consisting of a rigid front panel having a window, a rigid roof, a rigid rear panel, and two flexible side panels,
   b. fenders extending over the rear wheels and vertical posts fastened to the fenders, the rear panel of the enclosure being hingedly connected to the upper ends of the posts, each post having a forwardly directed flange and the rear panel having a similar flange corresponding to and overlying each of the post flanges, each of the said panel flanges having downwardly extending plates which embrace the upper portion of the corresponding post flange, and
   c. a flexible element extending from the enclosure on one side, under the engine compartment, to the enclosure on the other side.

2. A cab for use with a tractor having rear wheels, front wheels, and an engine compartment, comprising
   a. a main enclosure adapted to extend between the rear wheels and the front wheels and to overlie at least a portion of the compartment, the enclosure consisting of a rigid front panel having a window, a rigid roof, a rigid rear panel, and two flexible side panels,
   b. fenders extending over the rear wheels, the fenders having flat, substantially horizontal surfaces, the rear panel being connected to one plate of a hinge member, the other plate of which is attached to a fender surface, and a brace extending between the hinge plates to limit their angular movement, and
   c. a flexible element extending from the enclosure on one side, under the engine compartment, to the enclosure on the other side.

3. A cab for use with a tractor having rear wheels, front wheels, and an engine compartment, comprising
   a main enclosure adapted to extend between the rear wheels and the front wheels and to overlie at least a portion of the compartment, the enclosure consisting of a rigid front panel having a window, a rigid roof, a rigid rear panel, and two flexible side panels,
   b. fenders extending over the rear wheels, the fenders having flat, substantially vertical surfaces, a plate being fastened to each surface and terminating at its upper end with a horizontal flange, a pintle being welded to the flange and extending laterally of the tractor, and a post being attached to the rear panel of the enclosure rests on the flange and having a tubular socket to receive the pintle, and
   c. a flexible element extending from the enclosure on one side, under the engine compartment, to the enclosure on the other side.

4. A cab for use with a tractor having rear wheels, front wheels, and an engine compartment, comprising
   a. a main enclosure adapted to extend between the rear wheels and the front wheels and to overlie at least a portion of the compartment, and
   b. a flexible element extending from the enclosure on one side, under the engine compartment, to the enclosure on the other side, the flexible element being partly formed of chain, partly of cable and including a turnbuckle, a tube of elastomer material contacting said enclosure and extending over a portion of the element to prevent damage to the engine compartment.

5. A cab as recited in claim 4, wherein the front panel is in the general form of a trapezoid with the large base attached to the roof panel and the smaller base having an elastomer pad which rests on the engine compartment.

6. A cab as recited in claim 4, wherein one end portion of the enclosure is hingedly attached to the tractor.

7. A cab as recited in claim 6, wherein the flexible element is located at the other end portion of the enclosure.

8. A cab as recited in claim 4, wherein the enclosure consists of a rigid front panel having a window, a rigid roof, a rigid rear panel, and two flexible side panels.

9. A cab as recited in claim 8, wherein the tractor has fenders over the rear wheels, wherein vertical posts are fastened to the fenders, and wherein the rear panel of the enclosure hingedly connected to the upper ends of the posts.